United States Patent [19]
Lagsdin

[11] Patent Number: 5,992,883
[45] Date of Patent: Nov. 30, 1999

[54] STABILIZER PAD FOR VEHICLES

[76] Inventor: Andry Lagsdin, 54 King Hill Rd., Hanover, Mass. 02339

[21] Appl. No.: 08/734,861

[22] Filed: Oct. 23, 1996

[51] Int. Cl.$^6$ ...................................................... B60S 9/02
[52] U.S. Cl. ..................................... 280/763.1; 280/764.1
[58] Field of Search ............................. 280/763.1, 764.1, 280/766

[56] References Cited

U.S. PATENT DOCUMENTS

| | | | |
|---|---|---|---|
| 2,277,939 | 3/1942 | Thalhammer | 248/193 |
| 3,219,362 | 11/1965 | Epstein | 280/150.5 |
| 3,244,301 | 4/1966 | Vaughan | 214/138 |
| 3,495,727 | 2/1970 | Long | 214/138 |
| 3,642,242 | 2/1972 | Danekas | 248/354 R |
| 3,721,458 | 3/1973 | Mitchell | 280/150.5 |
| 3,897,079 | 7/1975 | MacKenzie et al. | 280/150.5 |
| 3,913,942 | 10/1975 | MacKenzie et al. | 280/150.5 |
| 3,930,668 | 1/1976 | Schuermann et al. | 280/150.5 |
| 4,023,828 | 5/1977 | MacKenzie et al. | 280/763 |
| 4,039,206 | 8/1977 | Nault | 280/763 |
| 4,546,996 | 10/1985 | Hanson | 280/764.1 |
| 4,761,021 | 8/1988 | Lagsdin | 280/764.1 |
| 4,889,362 | 12/1989 | Lagsdin | 280/763.1 |
| 5,015,008 | 5/1991 | Schupback | 280/764.1 |
| 5,050,904 | 9/1991 | Lagsdin | 280/764.1 |
| 5,051,057 | 9/1991 | Kremer | 414/685 |
| 5,054,812 | 10/1991 | Lagsdin | 280/764.1 |
| 5,466,004 | 11/1995 | Lagsdin | 280/763.1 |
| 5,544,540 | 8/1996 | Holman | 74/467 |
| 5,547,220 | 8/1996 | Lagsdin | 280/763.1 |

FOREIGN PATENT DOCUMENTS

| | | |
|---|---|---|
| 492912 CA | 5/1953 | Canada . |
| 1029715 CA | 4/1978 | Canada . |
| 1036148 CA | 8/1978 | Canada . |

*Primary Examiner*—Robert J. Oberleitner
*Assistant Examiner*—Robert J. McCarry, Jr.
*Attorney, Agent, or Firm*—Wolf, Greenfield & Sacks, P.C.

[57] ABSTRACT

A reversible stabilizer pad for use with stabilizer arms of vehicles. The reversible stabilizer pad has a plate with first and second ground contact faces pivotally coupled to the stabilizer arm such that the plate can rotate about the arm to engage the ground surface with either ground contact face. A cam is provided to prevent unintentional flipping of the stabilizer pad. In one embodiment, the stabilizer pad is of a two-piece construction to provide improved balance to the pad to prevent unintentional flipping of the pad. In another embodiment, the stabilizer arm includes a resilient plate for contacting the cam over a portion of a predetermined range of rotation of the pad with respect to the arm.

22 Claims, 9 Drawing Sheets

STABILIZER PAD FOR VEHICLES

FIELD OF THE INVENTION

The invention relates to stabilizer pads for vehicles, and more particularly, to an improved stabilizer pad and an apparatus for preventing a pivotally mounted, two-way stabilizer pad from reversing its orientation under its own weight.

BACKGROUND OF THE INVENTION

U.S. Pat. No. 4,889,362 discloses a reversible stabilizer pad for earth moving vehicles having a generally flanged first surface for engagement with, for example, gravel and soft earth, and a resilient surface for engagement with, for example, concrete or asphalt. This patent describes the use of rubber pads on one side of the stabilizer pad for ground contact when the vehicle is on a finished surface, such as concrete or asphalt, and flanges with grouser points on the opposite side of the stabilizer pad for ground contact when the vehicle is on an unfinished but hard ground surface that requires that the pads dig into the surface in order to better anchor and stabilize the vehicle when encountering difficult digging conditions. The flange side of the pad is unsuitable for contact with the finished surfaces since it could damage and/or mar the finished surface. The stabilizer pad is pivotally mounted to the end of a hydraulically operated arm such that the pad may be rotated to contact the ground with either the rubber pad side or the flange side facing down to contact the ground surface. When the vehicle is moved into a working position, if extra stability is needed, the stabilizer arms, on which the pads are mounted, are hydraulically operated to move from a retracted position, in which the arms generally extend upwardly and out of the way, to a use position, in which the arms extend downward at an angle with the pads contacting the ground surface. When the vehicle is to be moved, the arms are lifted back to the retracted position, the vehicle is moved to a new operating location and the stabilizer arms are brought down into the use position again, if necessary.

In prior stabilizer pad constructions such as the one described in U.S. Pat. No. 4,889,362, there has been a tendency for the pad to self-flip when the stabilizer arm is lifted. This self-flipping generally occurs when the flange side is down such that the stabilizer pad flips from the flange side down to the rubber pad side down. This occurs because the rubber pad side is typically much heavier than the flange side. When the pad inadvertently flips sides, an operator must manually flip the pad down so that the proper side is facing down. Frequently, however, the operator does not realize that the pad has self-flipped or, even if he/she realizes it, does not bother to fix it. When this occurs, the vehicle is used with the wrong side of the stabilizer pad in contact with the ground surface, which could result in increased hazard as well as increased wear of the rubber pads, leading to premature need for replacement. The self-flipping of the pad can be remedied with a securing or engaging bolt that is required to be secured in each position of the pad and to be disassembled and re-secured when the position of the pad is to be changed. This becomes time consuming and furthermore may involve parts that are easily lost. Further, the operator simply may not use the securing pin or bolts.

U.S. Pat. No. 4,889,362 discloses an automatically operatable latch that is adapted to rotate into an engagement with the pad when the pad is in a ground engaging surface, and is furthermore adapted to automatically rotate by gravitational force out of engagement with the pad when the arm of the earth moving machine that supports the pad is lifted. In this way, when the support arm is lifted, the latch disengages from the pad and the pad is easily rotated to its opposite position. It has been found, however, that rocks, gravel and other debris frequently get caught in the automatic latch disclosed in U.S. Pat. No. 4,889,362 which can prevent the latch from releasing when the arm is lifted. In many stabilizer constructions, the pad must rotate to some extent when the arm is lifted in order to allow the piston of the arm to retract into the cylinder. Failure of the latch to release can thus result in damage to the arm or pad.

Figure 14:
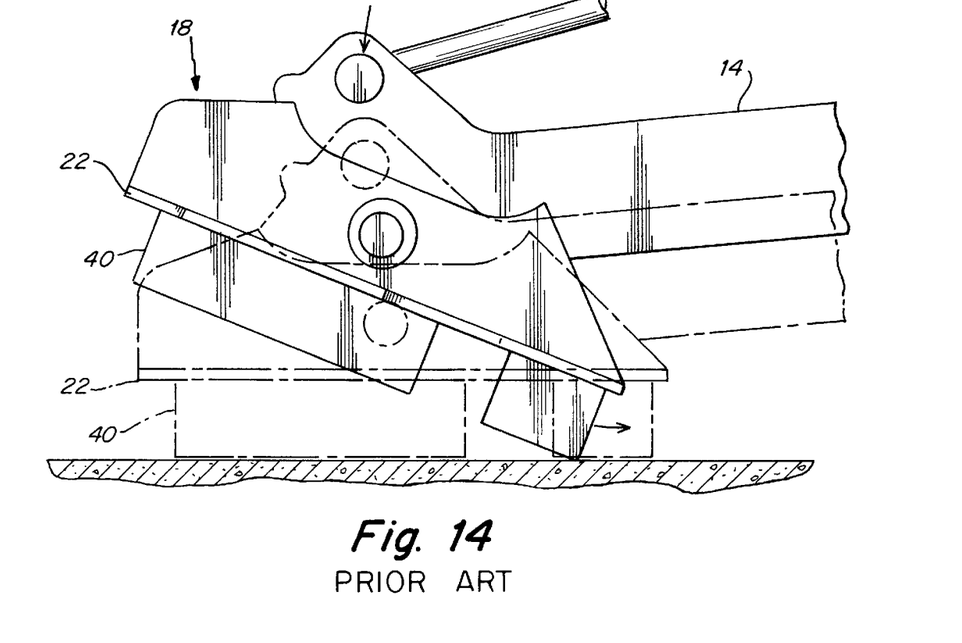
FIG. 14 is a side schematic view of a stabilizer pad according to the prior art showing the pad engaging a finished surface with the surface of the pad at an angle to the ground surface.

In prior art stabilizer pad constructions, there is also a tendency for the pad, when configured with the rubber pad side down, to engage the ground surface with the rubber surface at an angle to the ground rather than horizontal to the ground as desired. As shown in FIG. 14, when the rubber pad engages the ground surface at an angle, it results in uneven wear of the rubber pad and causes the operator of the vehicle to be jolted as the pad shifts to engage the ground surface.

It is an object of the present invention to provide an improved stabilizer pad/arm construction for a vehicle.

It is a further object of the present invention to provide a stabilizer pad/arm construction for an earth moving machine which will not flip sides unintentionally.

It is another object of the present invention to provide a stabilizer pad having improved balance to prevent unintentional flipping of the stabilizer pad.

SUMMARY OF THE INVENTION

Embodiments of the present invention are directed to stabilizer pads/arms for use with vehicles such as earth moving equipment or other construction vehicles. The stabilizer pad is coupled to the arm so as to be pivotable about an axis of rotation over a predetermined range of rotation. The stabilizer pad has a plate having first and second faces. One of the faces being particularly adapted for contacting soft earth or gravel and the other face being particularly adapted for contacting asphalt, concrete or another hard surface. The pad is rotatable about the pivot to contact the ground with either face of the pad.

In order to prevent the pad from accidentally rotating under its own weight so as to switch ground contact sides, in one embodiment of the present invention, the pad includes a resilient cam that is arranged to contact the stabilizer arm over at least a portion of the range of rotation to provide a resistance to rotation of the stabilizer pad. In a preferred embodiment, the cam has a hollow portion to enable the cam to adjust to dimensional tolerances between the stabilizer pad and the stabilizer arm.

In another embodiment of the present invention, the stabilizer pad is of a two piece construction having first and second plates coupled to the stabilizer arm by a pin. The two piece stabilizer pad is balanced to prevent inadvertent rotation of the stabilizer pad. In a preferred embodiment, at least one of the first and second plates is coupled to the pin in such a manner as to allow relative rotation of the first and second plates over a predetermined range of rotation.

In yet another embodiment, the cam is constructed of a rigid material such as steel, and the stabilizer arm includes a resilient plate for contacting the cam over a portion of the predetermined range of rotation of the pad.

DESCRIPTION OF THE DRAWINGS

For a better understanding of the present invention, reference is made to the drawings, which are incorporated herein by reference and in which.

DETAILED DESCRIPTION

Figure 1:
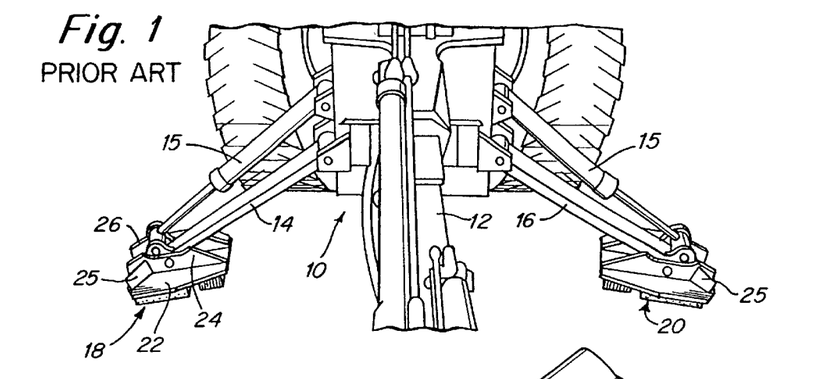
FIG. 1 is a fragmentary view of a typical loader/backhoe having stabilizer pads of the prior art secured thereto.

FIG. 1 is a fragmentary view of a typical loader/backhoe 10 having a shovel mechanism 12, and stabilizer arms 14 and 16, each having an associated stabilizer pad 18 and 20. Each of the stabilizer arms 14 and 16 is connected to the backhoe 10 by a hydraulic piston 15 used for engaging and retracting the stabilizer arms. When the backhoe 10 is being moved, the hydraulic pistons 15 are withdrawn so that the stabilizer arms pivot and are thus elevated above ground level. In this elevated position, the stabilizer pads 18 and 20 may be rotated between a gravel position and a paved position. FIG. 1 shows the stabilizer arms 14 and 16 and the hydraulic pistons 15 in a position for engaging the ground to stabilize the backhoe 10.

Figures 2, 3:
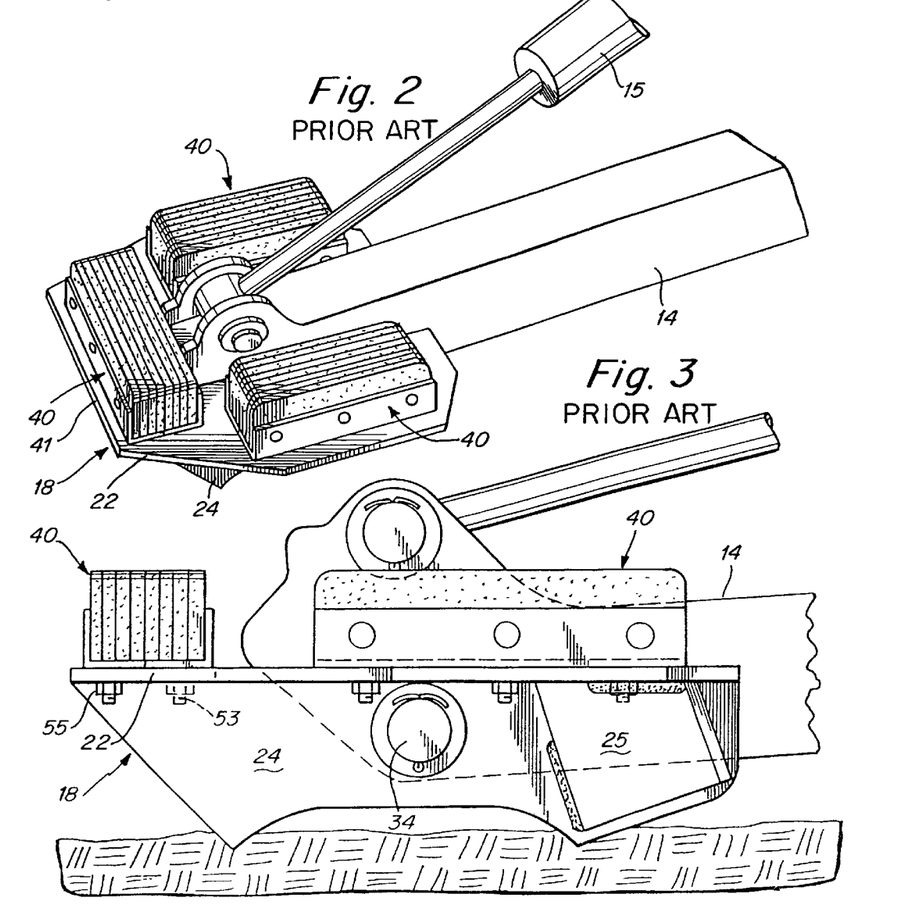
FIG. 2 is a perspective view of the stabilizer pad and arm of FIG. 1 in a gravel or dirt engaging position.
FIG. 3 is a side elevational view of the stabilizer pad and arm construction in the position of FIG. 2.
Figure 4:
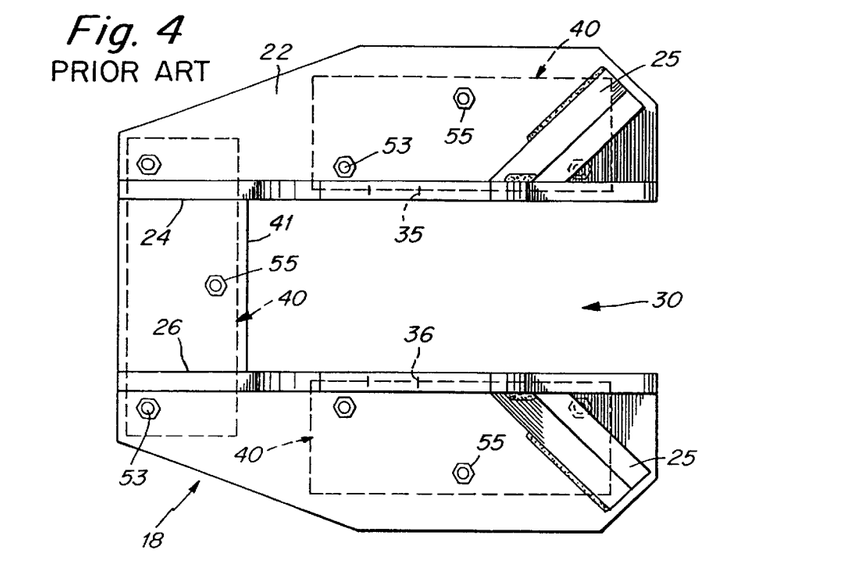
FIG. 4 is a bottom plan view of a stabilizer pad of FIGS. 1–3 shown uncoupled from a stabilizer arm.

The stabilizer pad 18 will be further described with reference to FIGS. 2 and 3. It should be understood that the construction of stabilizer pad 20 is substantially identical to that of stabilizer pad 18. The stabilizer pad 18 generally includes a flat plate 22 that has extending normal to the surface thereof flanges 24 and 26, both extending on one side from the surface of plate 22. The plate 22 is notched at 30 between flanges 24 and 26 and includes a cross-piece 41, as illustrated in FIG. 4. The plate is notched so as to accommodate the arm 14 and to enable the reversible rotation of the stabilizer pad 18. The stabilizer arm 14 includes a journal end for accommodating a pin 34 used to secure the stabilizer pad 18 to the arm 14. Pin 34 fits within holes 35 and 36 of flanges 24 and 26 of the stabilizer pad. The pin 34 may be secured in place by means of a typical cotter pin as illustrated in FIG. 3, or the pin 34 may be secured in place by using a bolt and nut.

The flat plate 22 has 3 laminated pads 40 mounted to a surface opposite the flanges 24 and 26. The resilient pads 40 are fixed to the flat plate 22 using bolts 53 and nuts 55. As discussed above, the side of the stabilizer pad having the resilient pads 40 is used for engaging a paved or flat surface, and the side of the stabilizer pad having the flanges 24 and 26 is for engaging a gravel or rough surface.

The weight associated with the cross piece 41 and the resilient pad 40 mounted thereto, creates an imbalance of the stabilizer pad, and thus the stabilizer pad has a tendency to flip or rotate about the pin 34. As shown in FIG. 4, counterweights 25 are added to the flange side of the flat plate 22, one on each side of the notch 30. These counterweights provide support for the flanges 24 and 26 and reduce the tendency of the pad to self-flip.

Figure 5:
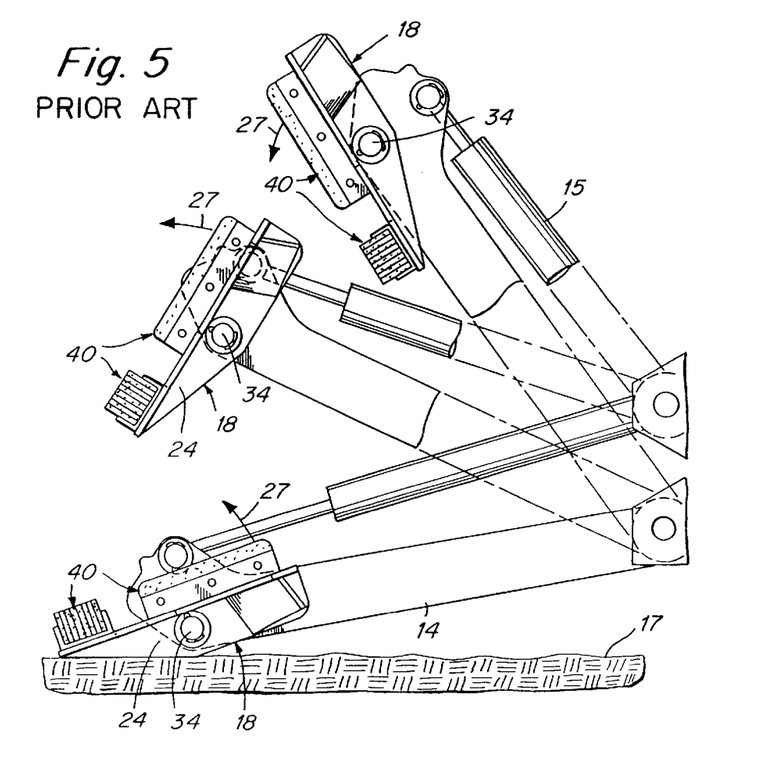
FIG. 5 is a sequential diagram illustrating the prior art problem of the stabilizer pad self-flipping.

FIG. 5 illustrates a sequence of events as the stabilizer arm 14 is lifted by the backhoe 10. In the bottom position, the pad 18 is illustrated with flanges 24 and 26 in contact with a gravel surface 17. The stabilizer arm 14 may be lifted by the hydraulic piston 15 in a rather jerky motion. In the sequence shown in FIG. 5, which should be viewed from the bottom up, the pad 18 is shown engaging the ground surface 17 at the bottom of the figure. As the arm 14 is raised by the hydraulic piston 15, there is an inertia force in the direction of arrow 127 caused by the imbalance of the stabilizer pad 18, forcing the stabilizer pad to rotate about the pin 34. The same inertia force is also illustrated in the middle position of FIG. 5, wherein the pad is shown as having been half-flipped upon raising of the stabilizer arm 14. The top position in FIG. 5 illustrates the pad completely flipped to the paved surface position. If the stabilizer arm 14 is lowered again to engage the ground, the pad is oriented for engaging a paved surface, rather than oriented for engaging a gravel surface as desired because of the self-flipping that has occurred.

An operator of the backhoe 10, will typically move the backhoe many times while operating the backhoe at a job site. The movement of the backhoe requires the stabilizer arms to be retracted upwardly so that the backhoe can be moved and for the stabilizer arms to be put down again with the same side of the stabilizer pad facing down. The undesired flipping of the stabilizer pad requires the operator to manually re-flip the pad before engaging the ground surface with the pad.

If the operator does not re-flip the pad, then the resilient pads 40 may exhibit excessive wear from the uneven ground surface, and the backhoe 10 may not be properly stabilized when the resilient pads 40 are used to engage an uneven or gravel surface.

The self-flipping problem described above, generally occurs from the gravel position to the paved position of the stabilizer pad, because of the imbalance associated with the location of the resilient pad 40 and the cross piece 41. Although the counterweights 25 tend to reduce the tendency of the pad to self-flip, because of cost and weight concerns, it is undesirable to make the counterweights 25 very large, and thus, they may not effectively prevent the pad from self-flipping.

Figure 6:
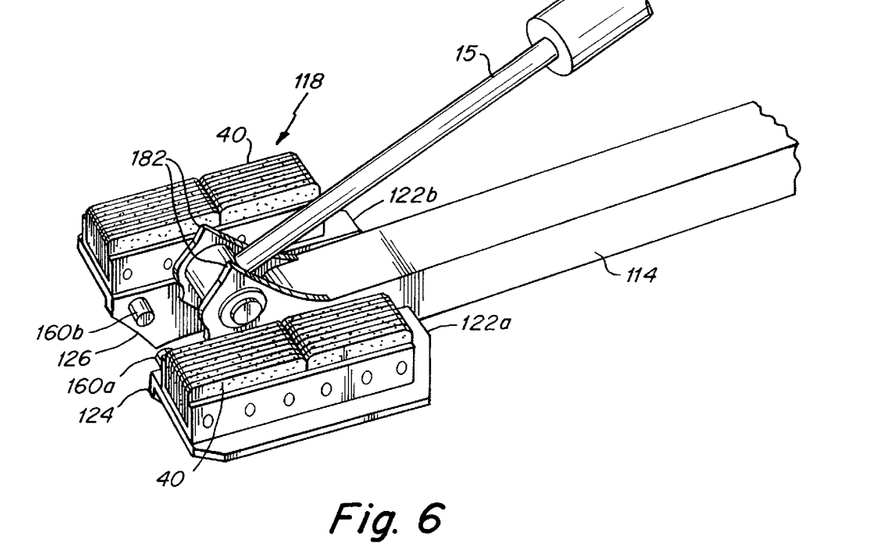
FIG. 6 is a perspective view of a stabilizer pad in a ground engaging position in one embodiment of the present invention.

A perspective view of a two-piece stabilizer pad 118 and a stabilizer arm 114 in accordance with one embodiment of the present invention is shown in FIG. 6. The stabilizer pad 118 of FIG. 6 is similar to the stabilizer pad 18 of the prior art, except that the cross piece 41, its accompanying resilient pad 40 and counterweights 25 have been removed. The two piece stabilizer pad 118 has two steel plates 122a and 122b. Each of the steel plates 122a and 122b has a corresponding flange 124 and 126 extending on one side from the surface thereof. Each of the steel plates 122a and 122b also has laminated pads 40, similar to the stabilizer pad 18 of the prior art. Stop lugs 160a and 160b are mounted to flat plates 122a and 122b respectfully. The stop lugs prevent 360° degree rotation of the stabilizer pad 118 similar to the cross piece 41 of the prior art stabilizer pad shown in FIG. 1. The stabilizer arm 114 has a counter-clockwise stop 180 for contacting the stop lugs 160a and 160b to limit the counter clockwise rotation on the stabilizer pad. The stabilizer arm also has ears 182 that function as a clockwise stop for contacting the stop lugs to limit the clockwise rotation of the stabilizer pad.

Figure 8:
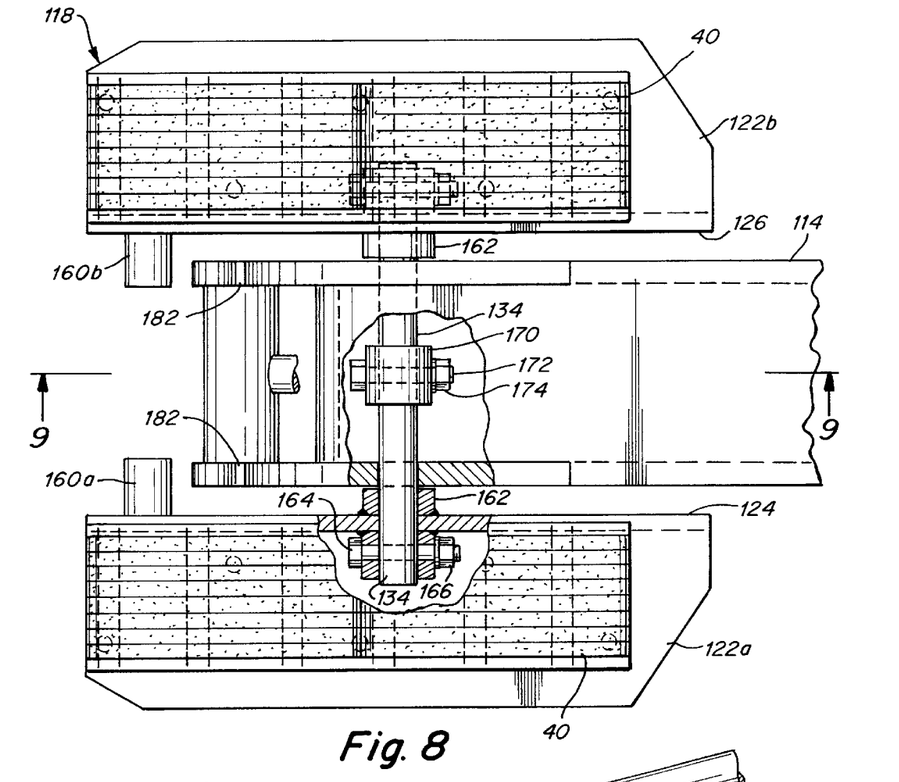
FIG. 8 is a top plan view as seen along line 8—8 of FIG. 7.
Figure 9:
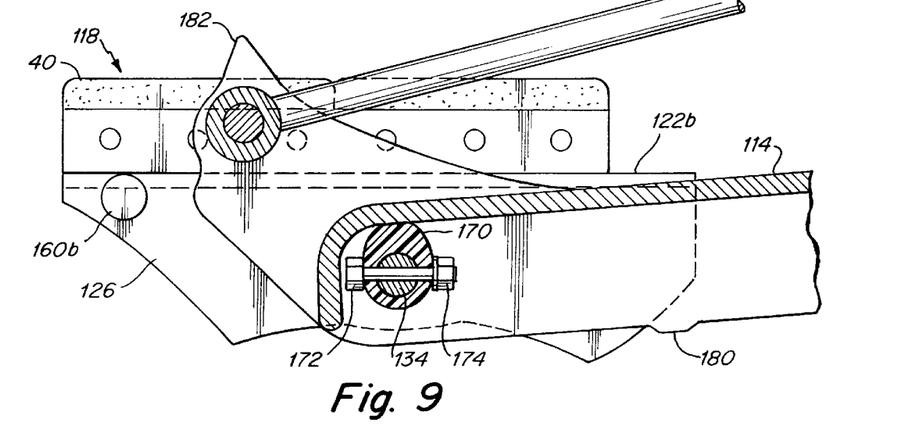
FIG. 9 is a cross-sectional side view taken along line 9—9 of FIG. 8.

As shown in FIG. 8, the stabilizer pad 118 mounts to the stabilizer arm 114 using a steel pin 134 similar to the stabilizer pads of the prior art. Each of the flat plates 122a and 122b of the stabilizer pad 118 has a bushing 162 welded thereon for receiving the pin 134. The steel pin 134 has a through hole at each end, and the bushing has a corresponding through hole for receiving a bolt 164. One bolt 164 along with one nut 166 is used to secure each of the flat plates 122a and 122b to the stabilizer arm, and to prevent relative rotation of flat plate 122a with respect to flat plate 122b. The embodiment of the present invention shown in FIG. 6 is lighter, less expensive to manufacture, and has improved balance over stabilizer pads of the prior art.

Figure 7:
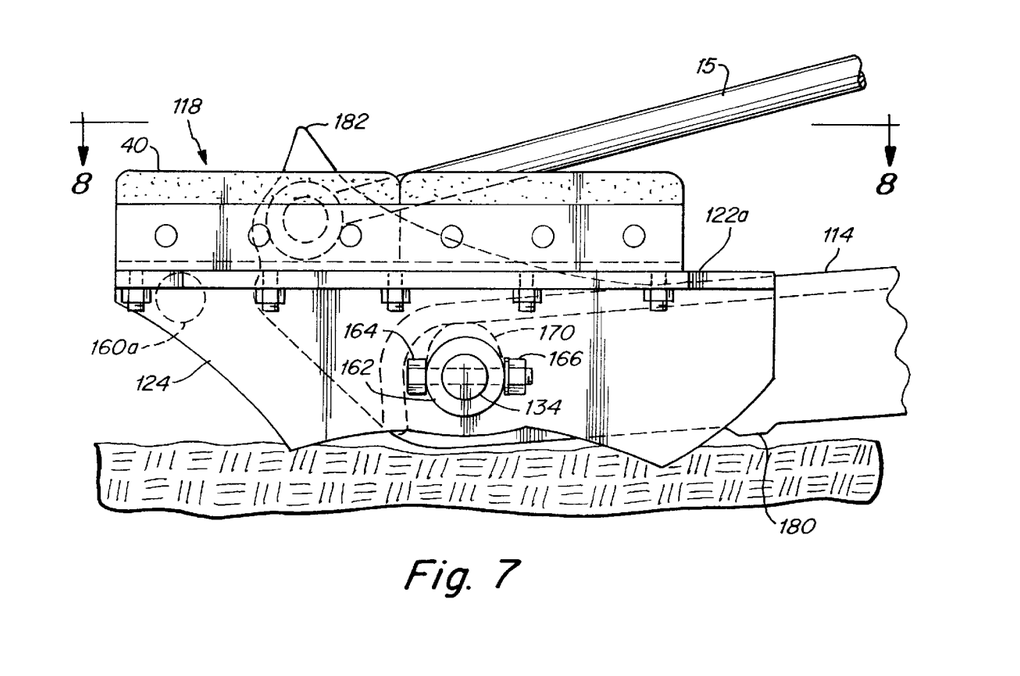
FIG. 7 is a side elevational view of the embodiment of the invention shown in FIG. 6.

A self-flipping prevention feature of the stabilizer pad 118 of FIG. 6 will now be described with reference to FIGS. 6–14. As shown in FIGS. 7 and 8, pin 134 has a third through hole located approximately in the center of the pin. A cam 170 is mounted to the pin using a bolt 172, passing through the third through hole, and a nut 174. The cam 170 is generally elliptical in shape and is constructed of a resilient material such as rubber. In a preferred embodiment the cam 170 is constructed of #95A shore polyurethane.

Figure 10:
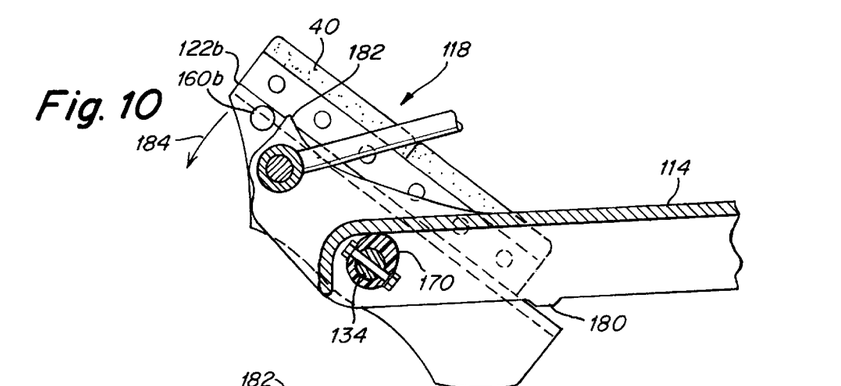
FIGS. 10–13 show a schematic cross-sectional view, similar to FIG. 9, showing the operation of a cam in accordance with one embodiment of the present invention.
Figure 11:
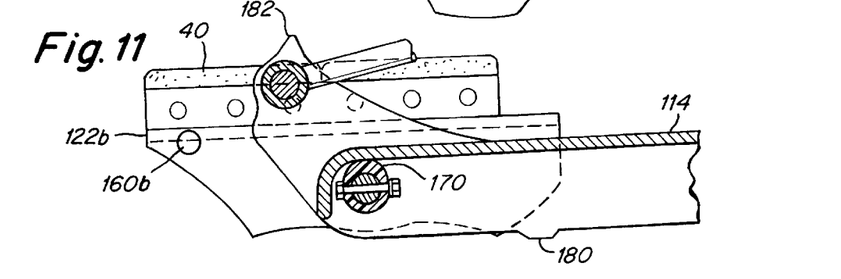
Figure 12:
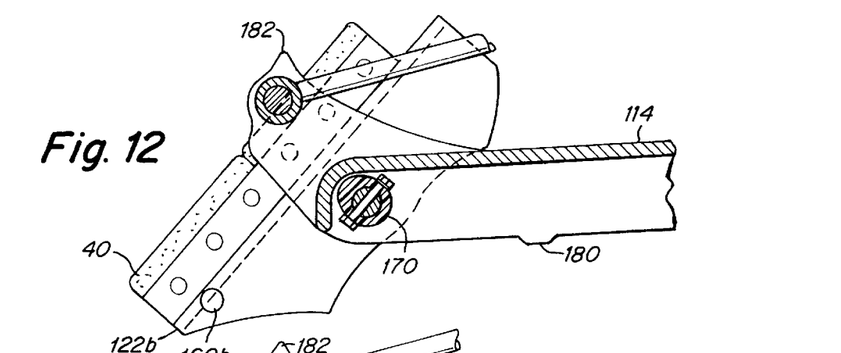
Figure 13:
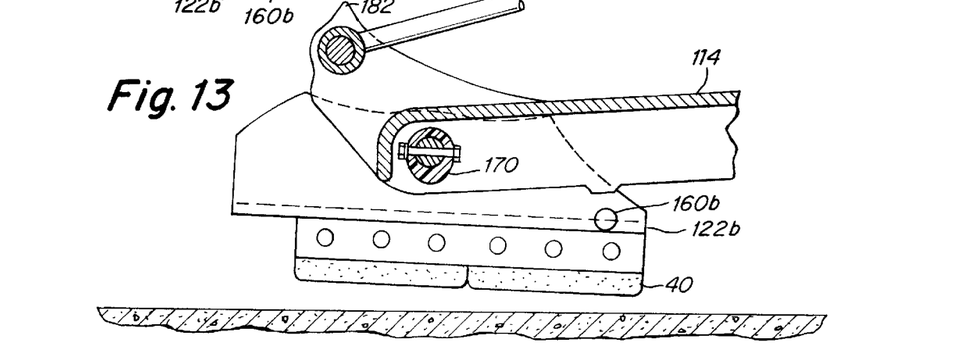

The operation of the cam 170 will now be described with reference to FIGS. 10–13 which show the progressive counter-clockwise rotation of the stabilizer pad 118 in the direction of arrow 184 from a first position in FIG. 10 to a final position in FIG. 13. In FIG. 10, the stabilizer pad is shown with the stop lugs 160a and 160b barely out of contact with the ears 182. In this position, with the stabilizer pad rotating in the direction of arrow 184, the cam 170 is starting to come in contact with the underside of the stabilizer arm 114. In FIG. 11, the stabilizer pad is in a rotational position just beyond the gravel engaging position in the counter-clockwise direction. In the rotational position shown in FIG. 11, the cam 170 provides the maximum resistance to rotation, as the resilient cam is in a compressed state and is exerting a force on the stabilizer arm to resist further rotation. In FIGS. 12 and 13 the cam is no longer in contact with the stabilizer arm and offers no resistance to rotation of the stabilizer pad with respect to the arm, so that the arm can rotate freely. In FIG. 13, the stabilizer pad is in the smooth surface engaging position, and because the stabilizer pad is balanced, the surface of the pad is parallel to the ground surface, prior to engaging the ground. Since the pad is parallel to the ground, the stabilizer pad evenly engages the ground surface preventing excess wear and any jolting of the vehicle as in prior art stabilizer pads described above with reference to FIG. 14.

Figure 15:
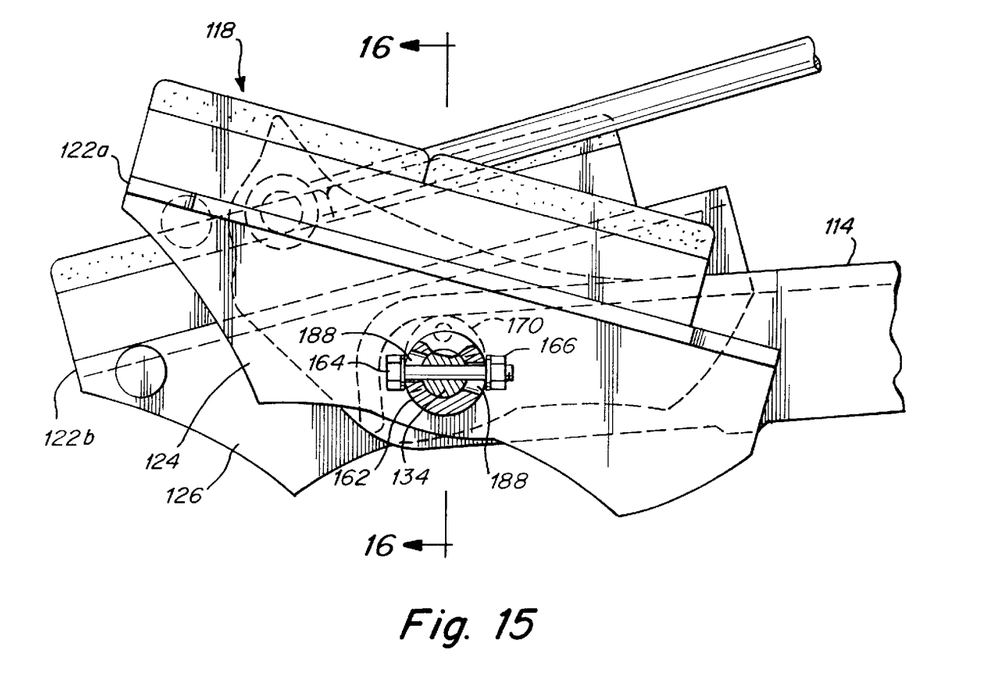
FIG. 15 is a partially broken away side elevational view similar to FIG. 7 of a stabilizer pad in accordance with an alternate embodiment of the present invention.
Figure 16:
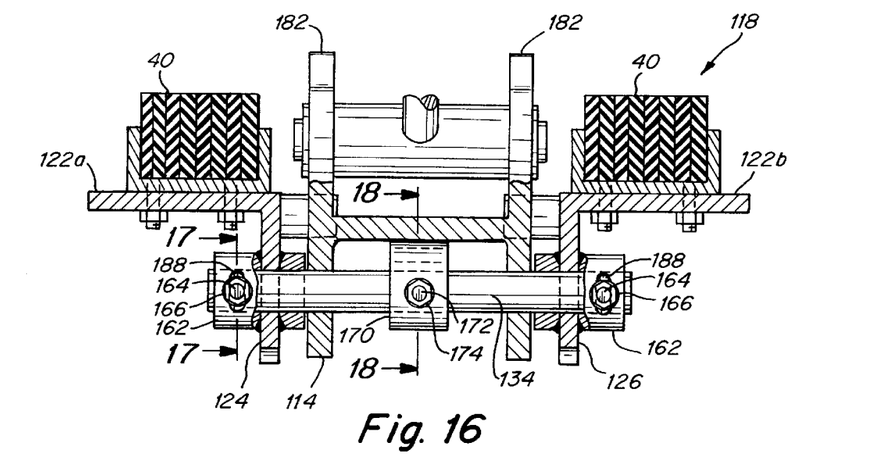
FIG. 16 is a cross-sectional end view taken along line 16—16 of FIG. 15 with steel plates 122a and 122b in a horizontal alignment.
Figure 17:
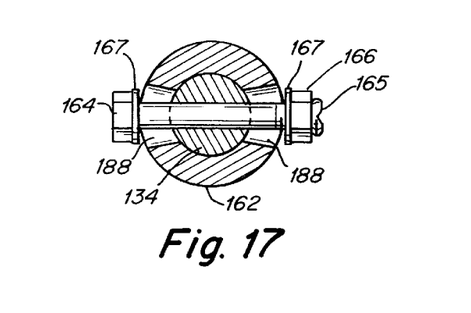
FIG. 17 is a cross-sectional view of a slotted sleeve arrangement taken along line 17—17 of FIG. 16.

As discussed above, each of the flat plates 122a and 122b are coupled to the pin 134 using a bushing 162, a bolt 164 and a nut 166 to prevent relative rotational movement of the flat plates. In one embodiment of the present invention, as shown in FIGS. 15–17, the through holes in the bushings 162 are elongated slots 188. The slots allow some relative rotational movement between the flat plates 122a and 122b to allow the stabilizer pad to adjust to uneven ground surfaces to provide greater stability of the vehicle. Washers 167 are provided under the heads of bolts 164 and under the nuts 166 to allow easier rotation of the flat plates. Also, the ends 165 of bolts 164 are staked to prevent the nuts 166 from backing off the bolt as the flat plates are rotated in the slots 188. In a preferred embodiment, the slots allow each of the flat plates to tilt over a range of 15 degrees, thus allowing a maximum possible difference in tilt between the steel plates of 30 degrees.

Figure 18A:
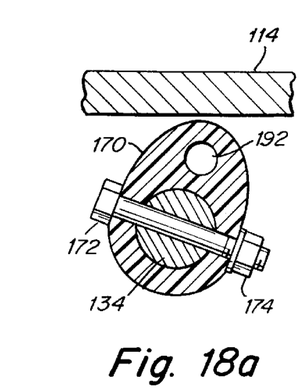
FIG. 18a shows a cross-sectional view along line 18—18 of FIG. 16 with the resilient cam in an uncompressed state.
Figure 18B:
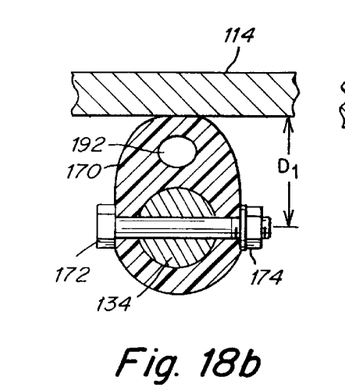
FIG. 18b is a cross-sectional view similar to FIG. 18a with the resilient cam in the first compressed state.
Figure 18C:
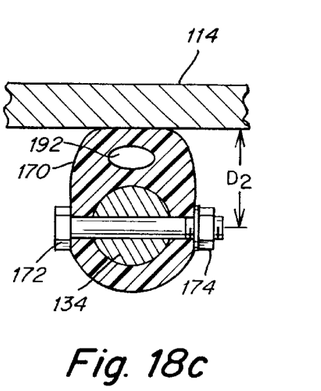
FIG. 18c is a cross-sectional view similar to FIG. 18a with the resilient cam in a second compressed state.

The cam 170 is designed to provide sufficient rotational resistance to prevent self-flipping of the stabilizer pad, but to allow rotation of the pad when sufficient force is provided by an operator desiring to flip the stabilizer pad. In a preferred embodiment of the present invention, the resilient cam 170 has a hollow portion 192. The hollow portion 192 allows greater compression of the resilient cam to account for tolerances in the distance between the pin 134 and the underside of the arm 114. As shown in FIGS. 18a and 18b, the resilient cam offers resistance to rotation when the distance between the center of the pin 134 and the stabilizer arm 114 is equal to a first value D1 and when the distance between the center of the pin and the stabilizer arm is equal to a second value D2.

Figure 19:
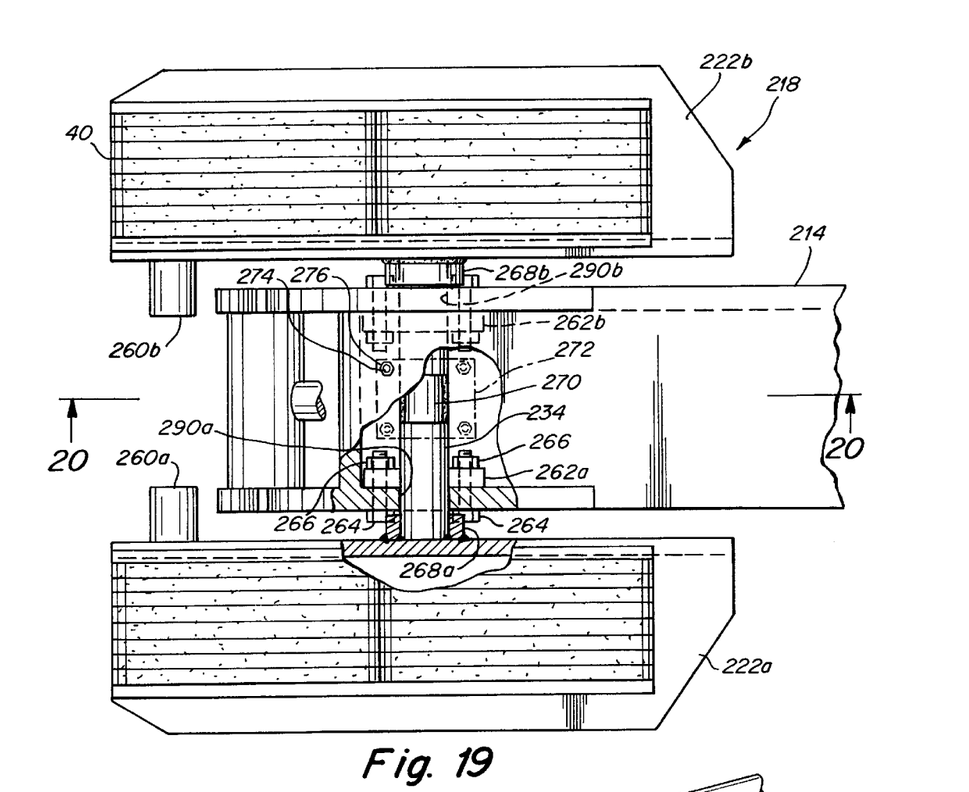
FIG. 19 is a partially broken away top plan view of another alternate embodiment of the present invention.

Another alternate embodiment of a stabilizer pad in accordance with the present invention will now be described with reference to FIGS. 19–22. FIG. 19 shows a partially broken away top plan view of a stabilizer pad 218 coupled to a stabilizer arm 214. The stabilizer pad 218 includes two steel plates 222a and 222b which are similar to steel plates 122a and 122b. The stabilizer pad 218 includes stop lugs 260a and 260b that prevent 360° rotation of the stabilizer pad by contacting stops 280 on the stabilizer arm 214 to prevent counter-clockwise rotation or by contacting ears 282 to limit clockwise rotation of the stabilizer pad. The steel plates 222a and 222b are connected together through a steel rod 234. Each of the steel plates is welded to the steel rod 234.

Figure 20:
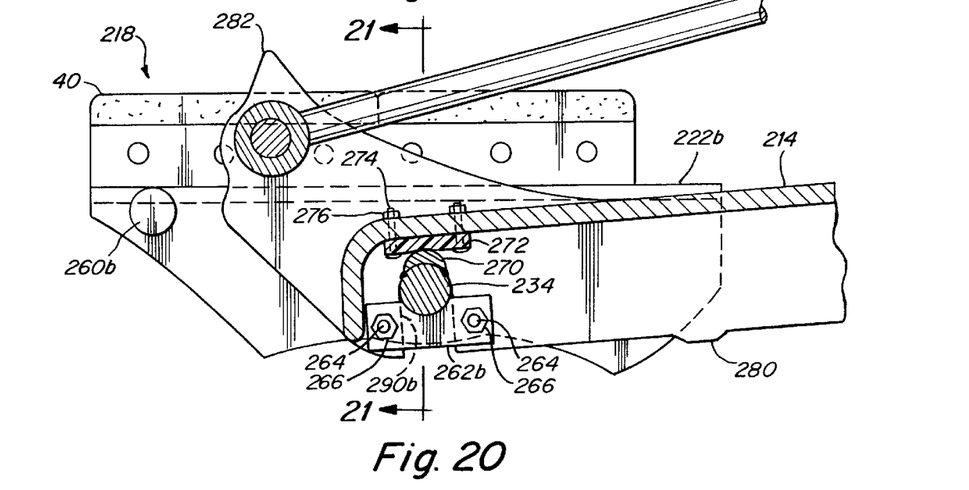
FIG. 20 is a cross sectional side view taken along line 20—20 of FIG. 19.
Figure 21:
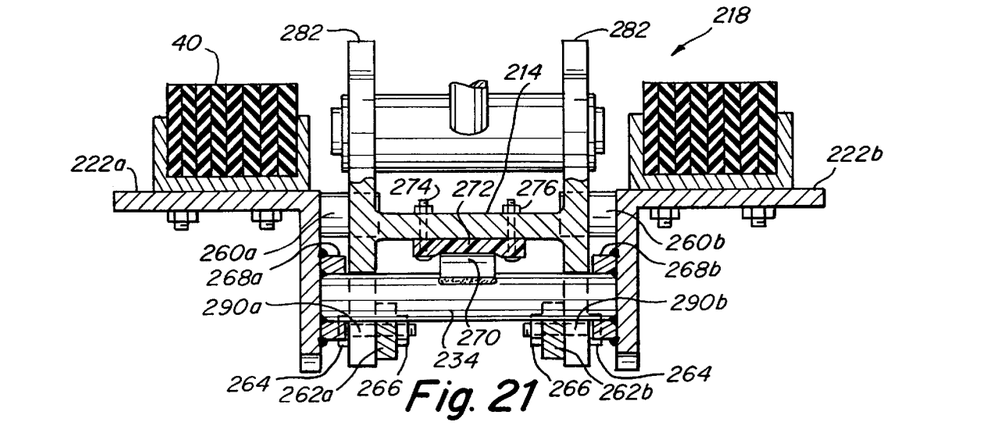
FIG. 21 is a cross sectional view taken along line 21—21 of FIG. 20.

Stabilizer arm 214 has two U-shaped cutouts 290a and 290b for receiving the steel rod 234 for mounting the stabilizer pad 218 to the stabilize arm 214. The stabilizer pad is held in place in the U-shaped cutouts using retainer plates 262a and 262b which are bolted to the stabilizer arm 214 after the steel rod 234 has been placed in the U-shaped cutouts. The retainer plates are coupled to the stabilizer arm using bolts 264 and nuts 266. Two bushings 268a and 268b are mounted on the steel rod 234 between the steel plates 222a, 222b and the stabilizer arm 214. The bushings 260a and 260b are used to keep the stabilizer pad 218 centered about the longitudinal axis of the stabilizer arm 214 and to prevent steel plates 222a and 222b from contacting bolts 264.

As in the above described embodiments, stabilizer pad 218 and stabilizer arm 214 are configured to prevent self-flipping of the stabilizer pad 218. The stabilizer pad 218 includes a steel cam 270 welded to pin 234, and stabilizer arm 214 includes a resilient urethane pad 272 mounted to the underside of the stabilizer arm using bolts 274 and nuts 276. The cam 270 and the resilient pad 272 operate in a manner similar to the cam 170 of the embodiment described above with respect to FIG. 8, to prevent self-flipping of the stabilizer pad. During rotation of the stabilizer pad with respect to the stabilizer arm, the rigid cam 270 compresses the resilient pad 272. In order for further rotation of the stabilizer pad to occur, the rotational force causing rotation of the stabilizer pad must be greater than the force necessary to compress the resilient pad.

Figure 22:
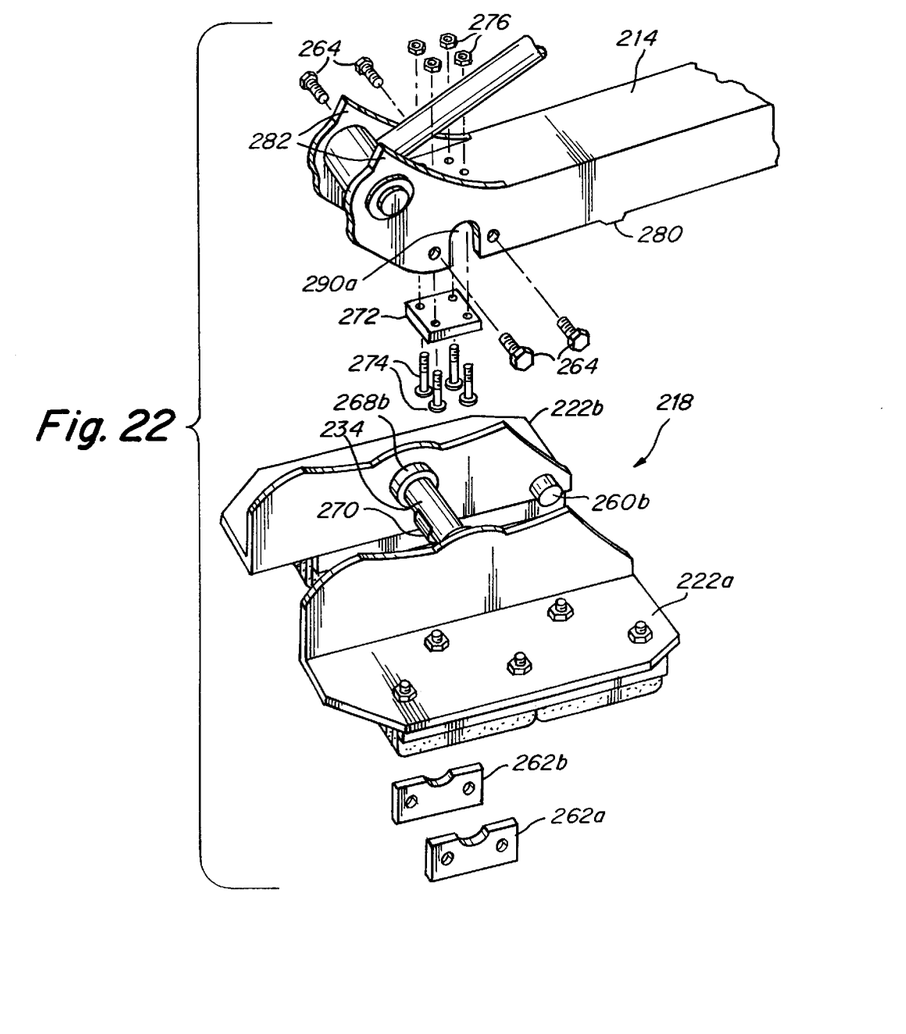
FIG. 22 is an exploded perspective view of the embodiment shown in FIG. 19.

As shown in FIG. 22, in a preferred embodiment, the stabilizer pad 218 is mounted to the stabilizer arm 214 with the cam 270 rotated 180° from the resilient plate 272. This allows the stabilizer pad to be mounted to the arm 214 without compressing the resilient pad.

Embodiments of the present invention provide a stabilizer pad/arm construction which eliminates the self-flipping problem associated with prior art stabilizer pads, and provides a stabilizer pad having improved balance over pads of the prior art, is lighter than pads of the prior art, uses less material, and thus is less costly to manufacture than pads of the prior art.

Having thus described particular embodiments of the invention, various alterations, modifications and improvements will readily occur to those skilled in the art. Such alterations, modifications and improvements as are made obvious by this disclosure are intended to be a part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A stabilizer pad for pivotally coupling to a stabilizer arm of a vehicle such that the stabilizer pad can rotate about said stabilizer arm over a predetermined range of rotation to engage a ground surface, the stabilizer pad comprising:

a plate having a first ground contact face and a second ground contact face; and a cam coupled to the plate so as to engage a surface on the stabilizer arm over at least a portion of the predetermined range of rotation to provide a resistance to rotation of the stabilizer pad with respect to the arm, one of the cam and the surface on the stabilizer arm being formed of a resilient material and the other of the cam and the surface on the stabilizer arm being formed of a rigid material.

2. The stabilizer pad of claim 1, further comprising a pin that couples the stabilizer pad to the stabilizer arm, and wherein the cam is coupled to the pin.

3. The stabilizer pad of claim 2, wherein the cam is made of a resilient material.

4. The stabilizer pad of claim 3, wherein the cam includes a hollow portion to allow deflection of the cam to accommodate dimensional tolerances between the stabilizer arm and the stabilizer pad.

5. The stabilizer pad of claim 4, wherein the plate includes first and second sections coupled together by the pin.

6. The stabilizer pad of claim 5, wherein at least one of the first and second sections of the plate is pivotally coupled to the pin to allow the first section to rotate with respect to the second section over a predetermined range of rotation.

7. The stabilizer pad of claim 2, wherein the plate includes first and second sections coupled together by the pin.

8. A stabilizer pad for pivotally coupling to a stabilizer arm of a vehicle such that the stabilizer pad can rotate about said stabilizer arm over a predetermined range of rotation to engage a ground surface, the stabilizer pad comprising:

a plate having a first ground contact face and a second ground contact face, and first and second sections;

a pin coupling the stabilizer pad to the stabilizer arm, and coupling together the first and second sections of the plate at least one of the first and second sections of the plate being pivotally coupled to the pin to allow the first section to rotate with respect to the second section over a predetermined range of rotation; and a cam coupled to the plate so as to engage the stabilizer arm over at least a portion of the predetermined range of rotation to provide a resistance to rotation of the stabilizer pad with respect to the arm, the cam being coupled to the pin.

9. The stabilizer pad of claim 8, wherein the predetermined range of rotation of the first section with respect to the second section is 30 degrees.

10. A stabilizer pad for pivotally coupling to a stabilizer arm of a vehicle to be stabilized such that the stabilizer pad can rotate about said arm over a predetermined range of rotation to engage a ground surface, the stabilizer pad comprising:

a pin that couples the stabilizer pad to the stabilizer arm; and a plate having a first ground contact face and a second ground contact face, the plate having first and second sections coupled together solely through the pin, at least one of the first and second sections of the plate being pivotally coupled to the pin to allow the first section to rotate with respect to the second section over a predetermined range of rotation.

11. The stabilizer pad of claim 10, wherein the predetermined range of rotation of the first section with respect to the second section is 30 degrees.

12. A stabilizer for stabilizing a vehicle, the stabilizer comprising:

a stabilizer arm;

a stabilizer pad pivotally coupled to the stabilizer arm such that the stabilizer pad can rotate about said arm over a predetermined range of rotation to engage a ground surface, said stabilizer pad including first and second sections;

a pin coupling the stabilizer pad to the stabilizer arm and coupling together the first and second sections of the stabilizer pad, at least one of the first and second sections of the stabilizer pad being pivotally coupled to the pin to allow the first section to rotate with respect to the second section over a predetermined range of rotation; and rotational resistance means for providing a resistance to rotation of the stabilizer pad with respect to the stabilizer arm.

13. The stabilizer of claim 12, wherein the rotational resistance means provides resistance to rotation over a portion of the predetermined range of rotation of the stabilizer pad.

14. The stabilizer of claim 12, wherein the stabilizer arm has at least one channel for receiving the pin, and the stabilizer further includes at least one retaining plate for securing the pin within the channel.

15. A stabilizer for stabilizing a vehicle, the stabilizer comprising:

a stabilizer arm having at least one channel;

a stabilizer pad pivotally coupled to the stabilizer arm such that the stabilizer pad can rotate about said arm over a predetermined range of rotation to engage a ground surface, said stabilizer pad including first and second sections;

a pin coupling the stabilizer pad to the stabilizer arm and coupling together the first and second sections of the stabilizer pad, the pin being received in the at least one channel of the stabilizer arm;

at least one retaining plate for securing the pin within the at least one channel; and rotational resistance means for providing a resistance to rotation of the stabilizer pad with respect to the stabilizer arm, the rotational resistance means including a rigid cam mounted on the pin and a resilient plate mounted on the arm and disposed to contact the rigid cam over at least a portion of the predetermined range of rotation.

16. A stabilizer for stabilizing a vehicle, the stabilizer comprising:

a stabilizer arm;

a stabilizer pad pivotally mounted on the stabilizer arm, the stabilizer pad rotating about the arm over a predetermined range of rotation to engage a ground surface;

a surface disposed on the stabilizer arm;

a cam mounted to rotate with the pad about the arm and to contact the arm surface over at least a portion of the predetermined range of rotation, at least one of the cam and the arm surface being resilient.

17. The stabilizer of claim 16 wherein the arm surface is resilient.

18. The stabilizer of claim 16 wherein the cam is resilient.

19. The stabilizer of claim 18 wherein the cam includes a hollow portion to allow deflection of the cam to accommodate dimensional tolerances between the surface on the stabilizer arm and the stabilizer pad.

20. The stabilizer of claim 16 further comprising a pin coupling the stabilizer pad to the stabilizer arm and wherein the cam is mounted on the pin and is eccentrically disposed about the pin.

21. The stabilizer of claim 16 wherein the cam is eccentrically disposed about a pin about which the cam rotates.

22. The stabilizer of claim 16 wherein the at least one of the cam and the arm surface is formed of polyurethane.

* * * * *